United States Patent [19]

Iizuka

[11] Patent Number: 5,385,511
[45] Date of Patent: Jan. 31, 1995

[54] SELECT SHOCK ATTENUATING METHOD AND SYSTEM FOR AUTOMATIC TRANSMISSION

[75] Inventor: Naonori Iizuka, Fuji City, Japan

[73] Assignee: Jatco Corporation, Fuji City, Japan

[21] Appl. No.: 62,289

[22] Filed: May 18, 1993

[30] Foreign Application Priority Data

May 18, 1992 [JP] Japan .................. 4-124644

[51] Int. Cl.$^6$ ............................. G60K 41/18
[52] U.S. Cl. ...................... 475/132; 477/117
[58] Field of Search ............ 475/128, 131, 132; 477/116, 117

[56] References Cited

U.S. PATENT DOCUMENTS

| | | | |
|---|---|---|---|
| 4,707,789 | 11/1987 | Downs et al. | 477/155 X |
| 4,730,521 | 3/1988 | Hayasaki et al. | 477/117 |
| 4,748,870 | 6/1988 | Sugino et al. | 477/117 |
| 4,807,496 | 2/1989 | Hayasaki et al. | 477/117 |
| 5,046,178 | 9/1991 | Hibner et al. | 477/117 |
| 5,131,295 | 7/1992 | Kodama | 477/155 |
| 5,329,830 | 7/1994 | Kitagawa et al. | 477/117 |

FOREIGN PATENT DOCUMENTS

| | | |
|---|---|---|
| 3-28571 | 2/1991 | Japan . |
| 2-285571 | 2/1991 | Japan .................. 477/117 |

OTHER PUBLICATIONS

Service Manual (Publication No. A261C07) "Nissan Full Range Electronically Controlled Automatic Transmission RE4R01A Type" 1987, pp. 1–90.

*Primary Examiner*—Michael Koczo, Jr.
*Attorney, Agent, or Firm*—Foley & Lardner

[57] ABSTRACT

According to a select shock attenuating method, line pressure, under which hydraulic fluid is supplied to hydraulically actuable and frictionally engageable coupling or couplings which are assigned to establish a gear ratio in an automatic transmission, is controlled. The automatic transmission has a plurality of selectable modes. In one mode, an appropriate one gear ratio state for a motor vehicle to start under normal road condition is established after placing a manual valve to a drive range position from a non-drive range position, while in another mode the automatic transmission is conditioned to another gear ratio. In the one mode, control signal on which the line pressure depends is subject to a pulse-like change with a first height corresponding to a first precharge level and a first duration corresponding to a first precharge period of time, then to a gradual increase at a first rate until a first coupling period of time is expired, and then to a drop to such a level as to keep the line pressure high enough to maintain torque transmission. In the another mode, the control signal is subject to a pulse-like change with a second height corresponding to a second precharge level and a second duration corresponding to a second precharge period of time, then to a gradual increase at a second rate until a second coupling period of time is expired, and then to a drop to such a level as to keep the line pressure high enough to maintain torque transmission.

5 Claims, 8 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | | ○ | | ○ | | ○ | | $\dfrac{\alpha_1+\alpha_2+\alpha_1\alpha_2}{\alpha_2(1+\alpha_1)}$ | 1.619 |
| | 3RD. SPEED | | ○ | ○ | ○ | | | ○ | | 1 | 1.000 |
| | 4TH. SPEED | | ○ | (○) | ○ | ○ | | | | $\dfrac{1}{1+\alpha_1}$ | 0.694 |
| ENGINE BRAKE RUNNING STATE | 1ST. SPEED | | | (○) | ○ | | ○ | (○) | (○) | | |
| | 2ND. SPEED | | | (○) | ○ | ○ | | (○) | | | |
| | 3RD. SPEED | | ○ | (○) | | ○ | | (○) | | | |
| | 4TH. SPEED | | ○ | (○) | ○ | ○ | | | | | |
| REVERSE | | ○ | | | | | ○ | | | $-\dfrac{1}{\alpha_1}$ | −2.272 |

( ) UNRELATED TO POWER TRANSMISSION

|  | SHIFT SOLENOID 64 | SHIFT SOLENOID 66 |
|---|---|---|
| 1ST. SPEED | ◯ | ◯ |
| 2ND. SPEED | ✕ | ◯ |
| 3RD. SPEED | ✕ | ✕ |
| 4TH. SPEED | ◯ | ✕ |

◯ : ON
✕ : OFF

SELECT SHOCK ATTENUATING METHOD AND SYSTEM FOR AUTOMATIC TRANSMISSION

BACKGROUND OF THE INVENTION

The present invention relates to a select shock attenuating method and system for an automatic transmission. The term "select shock" is used hereinafter to mean shock occurring in an automatic transmission during transition from neutral to any one of torque transmitting drive states.

U.S. Pat. No. 4,730,521 issued to Hayasaki et al. on Mar. 15, 1989 discloses an automatic transmission comprising a plurality of hydraulically actuable and frictionally engageable couplings, a hydraulic control system including a pressure regulator valve and a manual valve, and a control unit. A pressure regulator valve effects pressure regulation by generating line pressure under the control of an actuator in the form of a solenoid actuable actuator, also referred to as a line pressure solenoid. The manner of controlling the magnitude of the line pressure is well understood from claims 1 to 7 of U.S. Pat. No. 4,807,496 issued to Hayasaki et al. on Feb. 28, 1989. The control unit is programmed to condition the hydraulic control system in one state wherein hydraulic fluid under the line pressure is supplied to one of the plurality of hydraulically actuable and frictionally engageable couplings to establish one gear ratio after a manual selector valve has been placed to a forward drive range position from a neutral range position. After placing the manual selector valve to a reverse drive range position from the neutral range position, the control unit conditions the hydraulic control system in another state wherein hydraulic fluid under the line pressure is supplied to two of the plurality of hydraulically actuable and frictionally engageable couplings to establish another gear ratio.

Japanese Patent Application First (unexamined) Publication No. 3-28571 proposes a system for attenuating select shock which occurs during a transition after a manual selector valve has been placed to a forward drive range position from a neutral range position. According to this known system, the line pressure is momentarily increased toward a precharge level and then subject to an increase at a gradual rate. The precharge level and the rate of increase are determined after considering a stroke volume of a servo piston and torque bearing capacity of a hydraulically actuable and frictionally engageable coupling to be actuated.

An object of the present invention is to provide an improved control method and system which reduces the generation of shock tending to occur during a transition to any of available drive states from a neutral state in an automatic transmission.

SUMMARY OF THE INVENTION

In one embodiment, the invention is embodied in an automatic transmission comprising a hydraulic control system including a pressure regulator valve capable of effecting pressure regulation to generate line pressure under the control of an actuator, a control unit programmed to condition a hydraulic control system in one state wherein hydraulic fluid under the line pressure is supplied to one of a plurality of hydraulically actuable and frictionally engageable couplings to establish one gear ratio from a neutral or to condition the hydraulic control system in another state wherein hydraulic fluid under the line pressure is supplied to two of the plurality of hydraulically actuable and frictionally engageable couplings to establish another gear ratio from the neutral. The improvement is such that during a transition from the neutral to the one state, a control signal supplied to the actuator is subject to a pulse-like change with a first height corresponding to a first precharge level and a first duration of time corresponding to a first precharge period of time, then to a gradual increase at a first rate until a first coupling period of time is expired, and then to a drop to such a level as to keep the line pressure high enough to maintain torque transmission, while during a transition from the neutral state to the another state, the control signal is subject to a pulse-like change with a second height corresponding to a second precharge level and a second duration of time corresponding to a second precharge period of time, then to a gradual increase at a second rate until a second coupling period of time is expired, and then to a drop to such a level as to keep the line pressure high enough to maintain torque transmission.

In another embodiment, the present invention is embodied in an automatic transmission wherein one gear ratio is established owing to supply of hydraulic fluid under line pressure generated by a pressure regulator valve to one of hydraulically actuable and frictionally engageable couplings after placing a manual valve to a drive range position from a non-drive range position in a first mode, while in a second mode after placing the manual valve to the drive range position from the non-drive range position, another gear ratio is established owing to supply of hydraulic fluid under line pressure generated by the pressure regulator valve to at least two of the hydraulically actuable and frictionally engageable couplings. The improvement is such that after placing the manual valve to the drive range position from the non-drive range position in the first mode, a control signal, on which the pressure regulator valve effects pressure regulation in generating the line pressure, is subject to a pulse-like change with a first height corresponding to a first precharge level and a first duration of time corresponding to a first precharge period of time, then to a gradual increase at a first rate until a first coupling period of time is expired, and then to a drop to such a level as to keep the line pressure high enough to maintain torque transmission, while after placing the manual valve to drive range position from the non-drive range position in the second mode, the control signal is subject to a pulse-like change with a second height corresponding to a second precharge level and a second duration of time corresponding to a second precharge period of time, then to a gradual increase at a second rate until a second coupling period of time is expired, and then to a drop to such a level as to keep the line pressure high enough to maintain torque transmission.

BRIEF DESCRIPTION OF THE DRAWINGS

FIG. 2 is a table illustrating which one or combination of hydraulically actuable and frictionally engageable couplings are engaged in each of speeds or gear ratios;

DETAILED DESCRIPTION OF THE INVENTION

Figure 1:
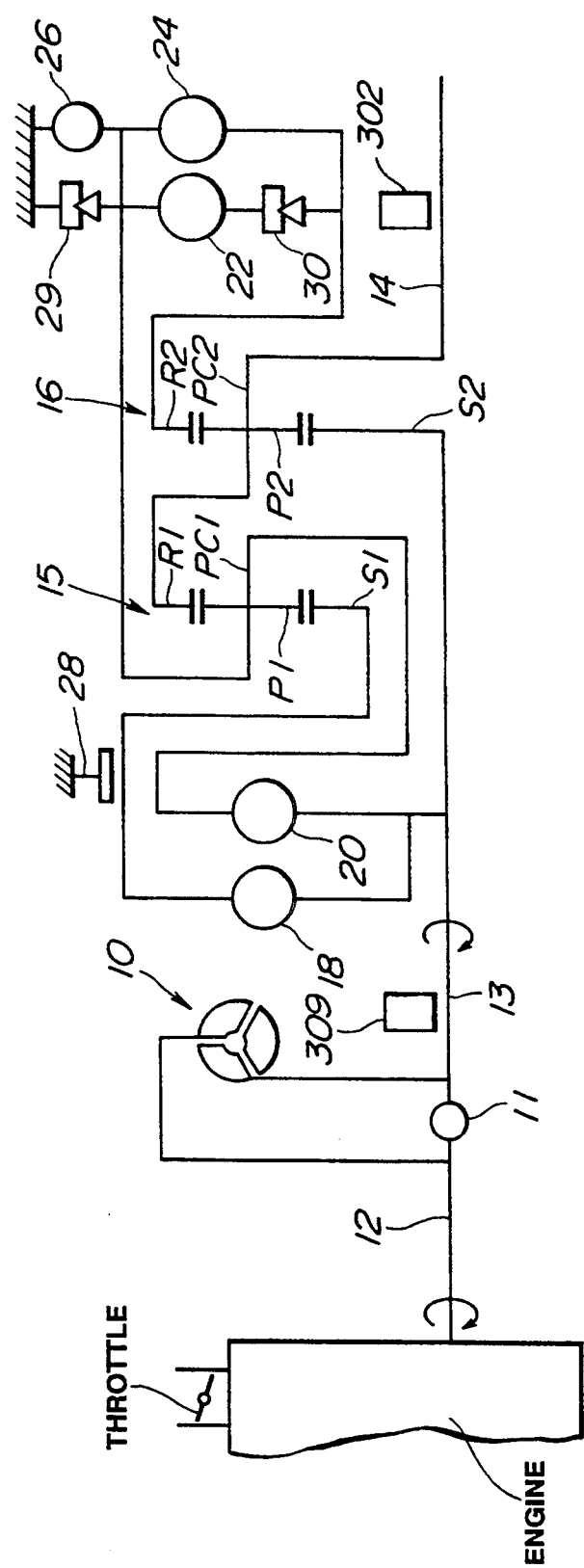
FIG. 1 is a schematic diagram of an automatic transmission drivingly coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees. The automatic transmission provides four forward speeds with an overdrive and a single reverse. The transmission includes an input shaft 13 connected to a turbine runner of the torque converter 10, and an output shaft 14 connected to a final drive gear assembly, not illustrated. It also includes a first planetary gear set 15, a second planetary gear set 16, a reverse clutch 18, a high clutch 20, a forward clutch 22, an overrunning clutch 24, a low & reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction which the engine shaft 12 rotates in), but preventing a rotation in the opposite reverse direction.

In this transmission, rotating states of various rotary elements (S1, S2, R1, R2, PC1, and PC2) of planetary gear sets 15 and 16 are varied by actuating the hydralically actuable and frictionally engageable couplings, namely, the clutches 18, 20, 22, 24, and brakes 26, 28, in different kinds of combination, thereby to vary a ratio, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ○ (circle) denotes that a particular coupling which it is assigned to is actuated or engaged, the signs α1 (alpha one) and α2 (alpha two) designate a ratio of number of teeth of the ring gear R1 to that of the sun gear S1 and a ratio of number of teeth of the ring gear R2 to that of the sun gear S2.

Figure 3:
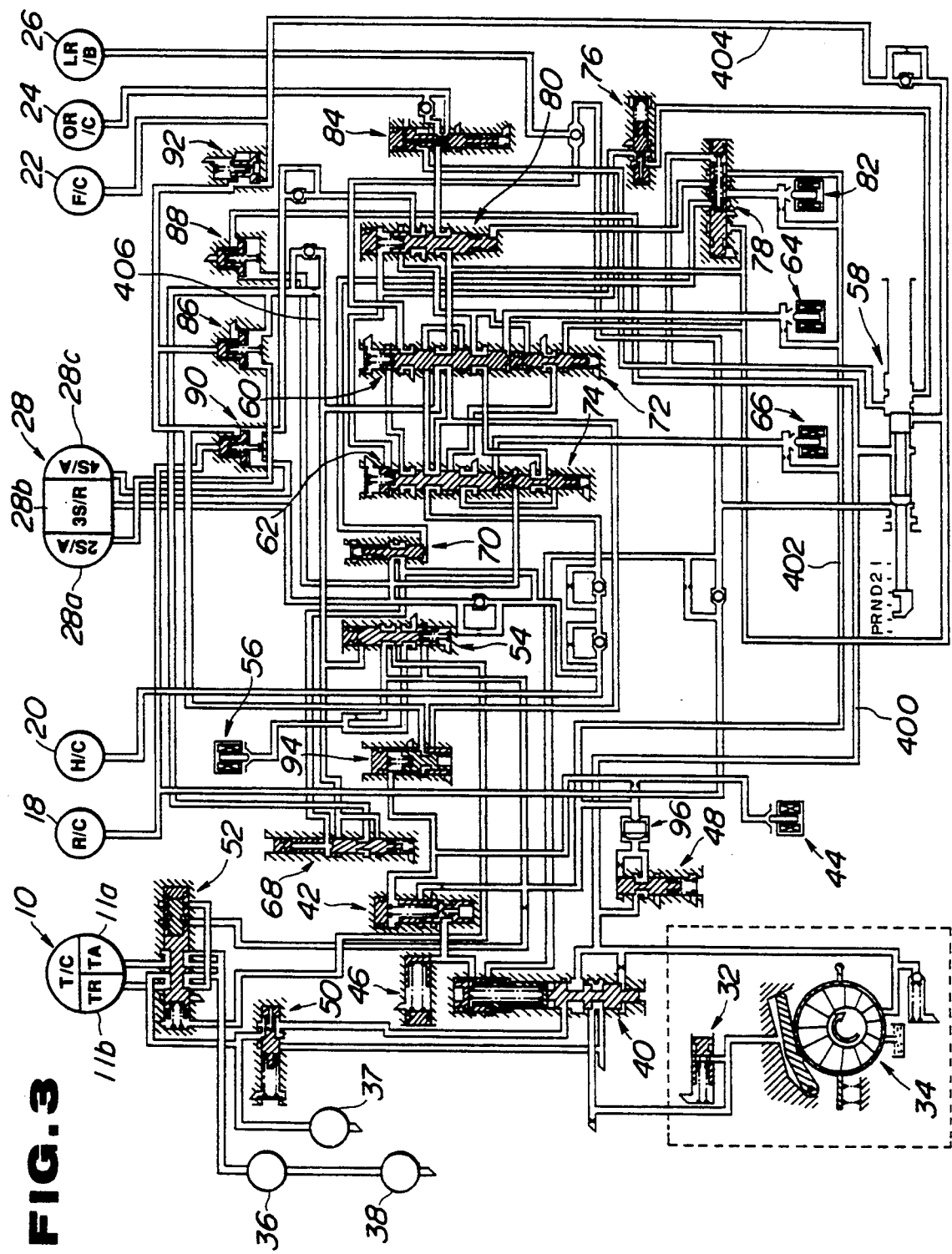
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual selector valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low & reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. on Mar. 15, 1989 discloses the automatic transmission of the RE4R01A type. Thus, reference is made to the above-mentioned service manual and the U.S. Pat. No. 4,730,521 for full understanding of the automatic transmission of this type.

In this automatic transmission, the magnitude of a line or system pressure is controllable by the line pressure solenoid 44. The manner of controlling the magnitude of the line pressure is described on pages I-22 to I-24 of the above-mentioned service manual. Reference is made to claims 1 to 7 of U.S. Pat. No. 4,807,496 issued to Hayasaki et al on Feb. 28, 1989 for full understanding of features of the line pressure control. Briefly, the pressure regulator valve 40 effects pressure regulation to generate line pressure under the control of the line pressure solenoid 44 which serves as an actuator for the pressure regulator valve 40. The line pressure solenoid 44 is of the duty cycle type which can vary ON duration per each cycle from 0 percent to 100 percent. A pilot pressure, i.e., a constant pressure, generated by the pilot valve 48 is fed to the pressure modifier valve 42. When it is in OFF state, the line pressure solenoid 44 causes a needle valve to close a drain circuit for the pilot pressure, while when it is in ON state, the drain circuit is opened. Increasing the percentage of OFF duration per each cycle causes a decrease in flow rate of hydraulic fluid drained via the drain circuit, resulting in an increase in throttle pressure supplied to the pressure modifier valve 42. The throttle pressure is decreased by decreasing the percentage of OFF duration per each cycle since the flow rate of hydraulic fluid discharged via the drain circuit is increased. The term "throttle pressure" is used herein to mean a pressure regulated by ON-OFF operation of the line pressure solenoid 44. The pressure modifier valve 42 uses the pilot pressure as a source of pressure and effects regulation of pressure in response to the throttle pressure to generate a pressure modifier pressure variable with the throttle pressure. This pressure modifier pressure is supplied to the pressure regulator valve 40. The pressure regulator valve 40 uses a pump discharge pressure displaced by the pump 34 as a source of pressure and effects pressure regulation in response to the pressure modifier pressure to generate the line pressure. The hydraulic fluid under the line pressure is supplied to the manual valve 58.

Figure 4:
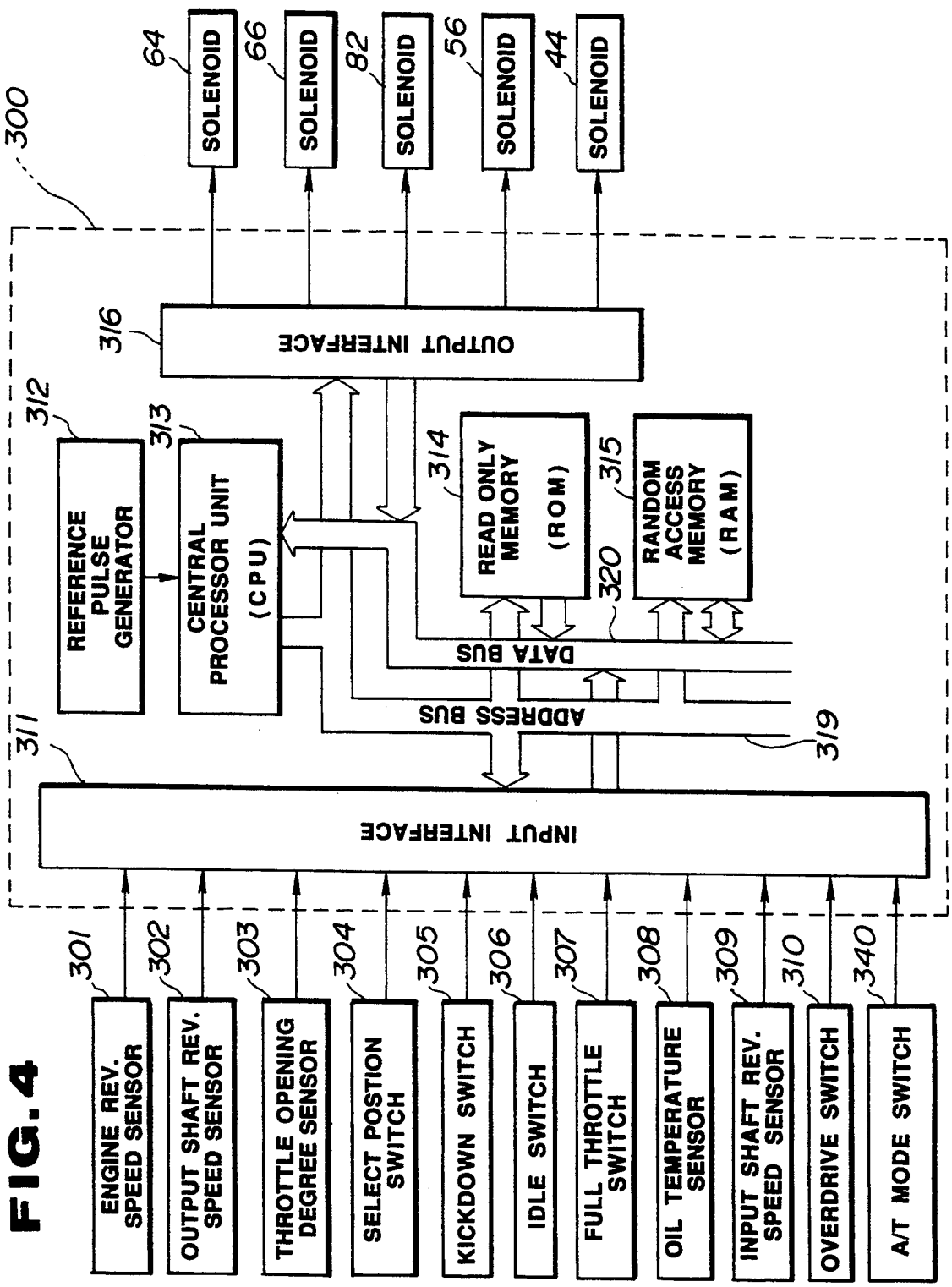
FIG. 4 is a block diagram of an automatic transmission (A/T) control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed sensor (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, an overdrive switch 310, and an automatic transmission (A/T) mode switch 340. The output shaft revolution speed sensor 302 detects a revolution speed of the output shaft 14. The input shaft revolution speed sensor 309 detects a revolution speed of the input shaft 13. The outputs of the control unit 300 are supplied to the shift solenoids 64 and 66, overrunning clutch solenoid 82, lock-up solenoid 56, and line pressure solenoid 44.

As shown in FIG. 3, the manual selector valve 58 has P (park), R (reverse), N (neutral), D (drive), 2 and 1 range position. With manipulation of a selector (not shown), the manual selector valve 58 may be placed to any one of the range positions. The select position switch 304 is provided to detect which one among the range positions the manual selector valve 58 is placed at. The A/T mode switch 340 is manually operable and has a power mode position, an automatic mode position and a snow mode position.

The shift valves 60 and 62 which are actuable by the corresponding shift solenoids 64 and 66. In order to condition the hydraulic control system in the first speed or gear ratio state, both shift solenoids 64 and 66 are energized and become ON states, respectively. In order to condition the hydraulic control system in the second speed or gear ratio state, the shift solenoid 64 is deenergized and becomes OFF state, while the shift solenoid 66 is energized and becomes ON state. In the third speed or gear ratio state, both of the shift solenoids 64 and 66 are not energized and assume OFF states, respectively. In the fourth speed or gear ratio state, the shift solenoid 64 is energized and assumes ON state, while the shift solenoid 66 is not energized and assumes OFF state. This relationship is tabulated in FIG. 5.

The shift solenoids 64, 66 and the line pressure solenoid 44 are under the control of the automatic transmission control unit 300.

Reference is made to pages I-22 to I-27 of the service manual (publication No. A261C07) and to the U.S. Pat. No., 4,730,521 for explanation of actuation of the solenoids 44, 64 and 66, and valves 42, 60 and 62. The necessary control functions are performed in the control unit 300.

Figure 6:
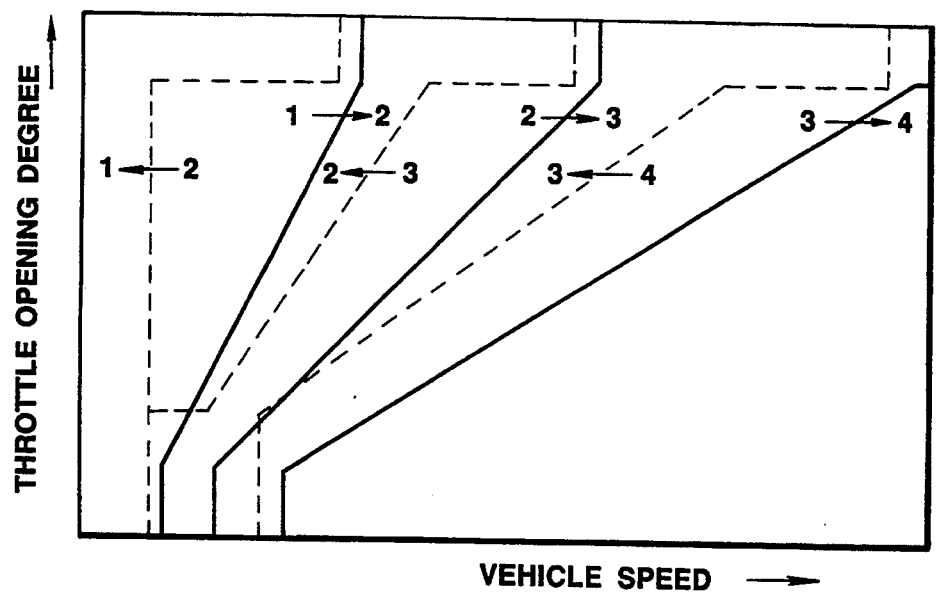
FIG. 6 illustrates a D range economy pattern which is used when a manual selector valve is placed in a D range position in an automatic mode.

FIG. 6 illustrates a D range economy pattern which is used in the control unit 300 when the manual selector valve 58 is placed at the D range position and the automatic mode is selected by the A/T mode switch 340. In FIG. 6, the fully drawn lines show a set of 1-2 upshift points, a set of 2-3 upshift points, and a set of 3-4 upshift points, respectively, while the broken lines show a set of 2-1 downshift points, a set of 3-2 downshift points, and a set of 4-3 downshift points, respectively.

Figure 7:
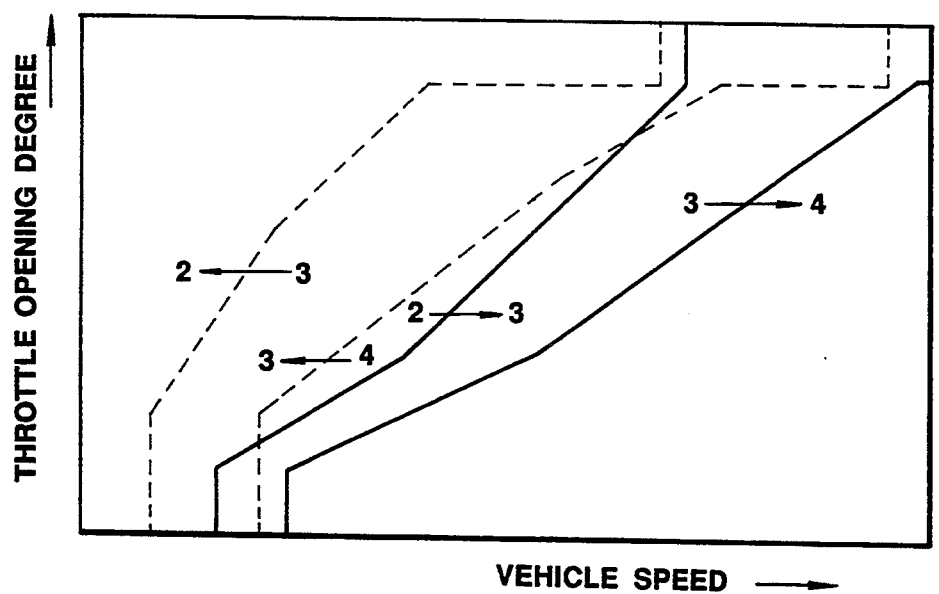
FIG. 7 illustrates a D range snow pattern which is used when the manual valve is placed in the D range position in a snow mode.

FIG. 7 illustrates a D range snow pattern which is used in the control unit 300 when the manual selector valve 58 is placed at the D range position and the snow mode is selected by the A/T mode switch 340. In FIG. 7, the fully drawn lines show a set of 2-3 upshift points and a set of 3-4 upshift points, while the broken lines show a set of 3-2 downshift points and a set of 4-3 downshift points. As different from the D range economy pattern, with the D range snow pattern, the automatic transmission is conditioned to establish the second speed or gear ratio after placing the manual selector valve 58 to the D range position from the N range position, and the first speed or gear ratio is not allowed to be established. Thus, the D range snow pattern is suitable for starting the automotive vehicle from a standstill on road with low friction coefficient.

The control unit 300 is programmed to perform a gear shift control in accordance with the D range economy pattern shown in FIG. 6 when the manual selector valve 58 is placed at the D range position in the automatic mode, while in the snow mode, the D range snow pattern shown in FIG. 7 is used for the gear shift control when the manual selector valve 58 is placed at the D range position.

Referring to FIGS. 1, 2 and 3, let us now consider how the first speed or gear ratio is established after placing the manual selector valve 58 to the D range position from the neutral position in the automatic mode. In the N range position, hydraulic fluid under the line pressure is supplied via a line pressure circuit 400 to and blocked by the manual selector valve 58 as shown in FIG. 3. For ease of control, both of the shift solenoids 64 and 66 are energized in the N and P range positions. Placing the manual selector valve 58 to the D range position from the N range position causes the control unit 300 to keep energizing both of the shift solenoids 64 and 66 since the shift control in accordance with the D range economy pattern shown in FIG. 6 is performed when the A/T mode switch 340 takes the automatic mode position. With energization of both of the shift solenoids 64 and 66, the associated drain circuits for the pilot pressure are closed to allow supply of pilot pressure to one end of the shift valves 60 and 62, respectively. The pilot pressure generated by the pilot valve 48 is distributed via a pilot pressure circuit 402 to the shift solenoid 64 and 66.

Since the line pressure circuit 400 is allowed to communicate with a first gear circuit 404, the hydraulic fluid is supplied via the first gear circuit 404 to a servo motor, not shown, of the forward clutch 22. The flow rate of hydraulic fluid supplied to the servo motor of the forward clutch 22 is determined by the magnitude of the line pressure generated by the pressure regulator valve 40. During a precharge period of time, a servo piston of the servo motor moves toward a position at which the frictional elements of the forward clutch 22 are about to engage, and then the engagement progresses toward the full complete engagement owing to an increase in pressure within the servo motor. The term "a coupling period of time" is used herein to mean a period of time from a moment when a command for establishing a gear ratio is issued to a moment when engagement of one or a plurality of hydraulically actuable and frictionally engageable couplings is completed to establish the gear ratio. The first gear ratio circuit 404 distributes hydraulic fluid to the shift valve 60, 4-2 relay valve and overrunning clutch control valve 80. Via the shift valve 68, the hydraulic fluid is supplied to the shift valve 62 and the accumulator control valve 94.

Next, let us consider how the second speed or gear ratio is established after placing the manual selector valve 58 to the D range position from the neutral position in the snow mode. Placing the manual selector valve 58 to the D range position from the N range position causes the control unit 300 to deenergize the shift solenoid 64 with the shift solenoids 66 kept energized since the shift control in accordance with the D range snow pattern shown in FIG. 7 is performed when the A/T mode switch 340 takes the snow mode position. Upon deenergization of the shift solenoid 64 with the shift solenoid 66 energized, the drain circuit for the pilot pressure associated with the shift solenoid 64 is opened, while the drain circuit for the pilot pressure associated with the shift solenoid 66 is closed. Thus, the pilot pressure does not act on the one end of the shift valve 60, while the one end of the shift valve 62 is subject to the pilot pressure. Since the shift valve 60 is not subject to the pilot pressure, the first gear circuit 404 is in fluid communication with a second gear circuit 406. The second gear circuit 406 leads to the second speed apply chamber 28a of the band brake 28 via the 1-2 accumulator 86, and also to the first shuttle valve 54 and servo charger valve 68.

Since the line pressure circuit 400 is allowed to communicate with the first gear circuit 404, the hydraulic fluid is supplied via the first gear circuit 404 to a servo motor, not shown, of the forward clutch 22, and the hydraulic fluid is supplied via the second gear circuit 406 to the second speed apply chamber 28a of the band brake 28. The flow rate of hydraulic fluid supplied to the servo motor of the forward clutch 22 and to the second speed apply chamber 28a of the band brake 28 is determined by the magnitude of the line pressure generated by the pressure regulator valve 40.

The control unit 300 is programmed such that the second speed or gear ratio is established after placing the manual selector valve 58 has been placed to the 2 range position from the N range position.

The manner of the line pressure control is explained below in principle with reference to the signal diagram shown in FIG. 10.

Figure 10:
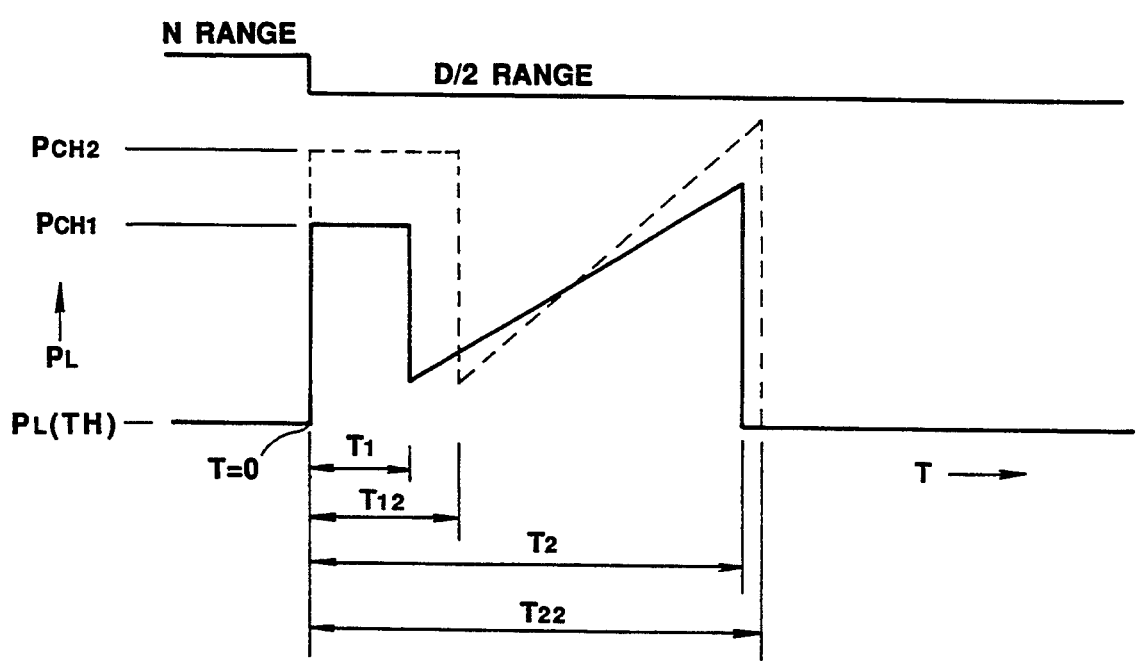
FIG. 10 is a timing diagram illustrating in broken line the manner of variation in the target line pressure after the manual selector valve has been placed from a N (neutral) range position to the D range position in the snow mode or a 2 (second hold) range position in comparison with the manner of variation, illustrated by the fully drawn line, in the target line pressure after the manual selector valve has been placed from the N range position to the D range position in the automatic mode.

At the top of FIG. 10 is shown a change in the output signal of the select position switch 304 from the N range position indicative signal to the D range position indicative signal or 2 range position indicative signal. Let us now assume that the manual selector valve 58 has been placed to the D range position in the automatic mode selected by the A/T mode switch 340. Upon or after occurrence of a change in the output signal of the select position switch 304 from the N range position indicative signal to the D range position indicative signal, a target line pressure $P_L$ indicative signal, i.e., a control signal on which the line pressure solenoid 44 operates, is subject to a pulse-like change or increase with a height corresponding to a first precharge level $P_{CH1}$ and a first duration of time corresponding to a first precharge period of time $T_1$, then to a gradual increase at a first rate $DP_{L1}$ until a first coupling period of time $T_2$ is expired, and then to a drop to a normal line pressure level $P_L$ (TH) that is a function of the throttle opening degree TH. The fully drawn line illustrates the change in the target line pressure $P_L$ indicative signal. In accordance with this change in the target line pressure $P_L$ indicative signal, the pressure regulator valve 40 generates the line pressure under the control of the line pressure solenoid 44. Thus, the line pressure in rapidly increased to the first precharge level $P_{CH1}$, then subject to a drop. After this drop, the line pressure is gradually increased at the rate appropriate for smooth engagement of the forward clutch 22, and then dropped to the normal line pressure level that is determined in response to the throttle opening degree.

Let us now assume that the manual selector valve 58 has been placed to the D range position in the snow mode selected by the A/T mode switch 340. In this case, the second speed or gear ratio is established owing to engagement of the forward clutch 22 and engagement of the band brake 28. Upon or after occurrence of a change in the output signal of the select position switch 304 from the N range position indicative signal to the D range position indicative signal, the target line pressure $P_L$ indicative signal is subject to a pulse-like change or increase with a height corresponding to a second precharge level $P_{CH2}$ and a second duration of time corresponding to a second precharge period of time $T_{12}$, then to a gradual increase at a second rate $DP_{L2}$ until a second coupling period of time $T_{22}$ is expired, and then to a drop to the normal line pressure level $P_L$ (TH). The broken line illustrates this change in the target line pressure $P_L$ indicative signal. The second precharge level $P_{CH2}$ is higher than the first precharge level $P_{CH1}$, and the second rate $DP_{L2}$ is different from the first rate $DP_{L1}$. In this embodiment, the second precharge period of time $T_{12}$ is slightly longer than the first precharge period of time $T_1$, but the second coupling period of time $T_{22}$ is substantially the same as the first coupling period of time $T_2$. Owing to this line pressure control policy, the second speed or gear ratio is established smoothly and as quickly as the first speed or gear ratio is. The line pressure control in establishing the second gear ratio after placing the manual selector valve 58 to the 2 range position from the N range position is substantially the same as the line pressure control policy just discussed in connection with the broken line shown in FIG. 10.

Figures 5, 9:
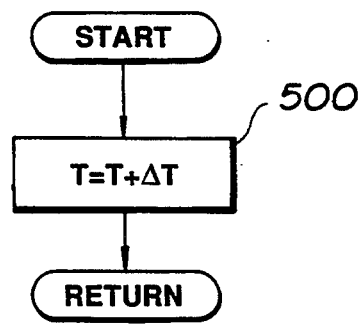
FIG. 5 is a table illustrating states to be assumed by shift solenoids to condition the hydraulic control system in each of the speeds or gear ratios.
FIG. 9 is a flow diagram of a timer routine executed at regular intervals.
Figure 8:
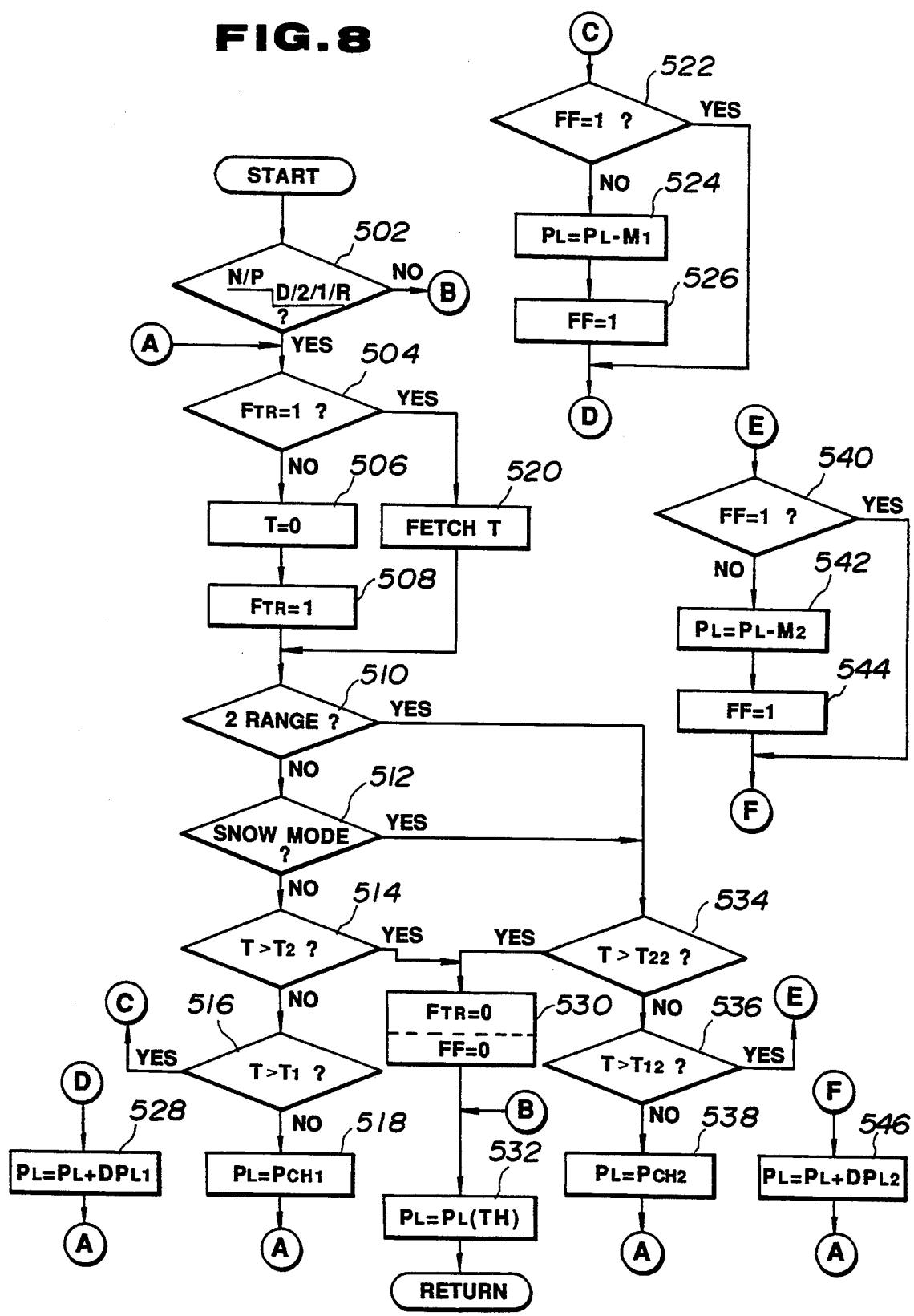
FIG. 8 is a flow diagram of a routine to determine a target line pressure $P_L$.

The flow diagram shown in FIG. 8 shows an example of a routine for the line pressure control explained with reference to FIG. 10. The flow diagram shown in FIG. 9 is a timer routine executed at regular intervals. In the execution of the timer routine, increment of a timer T is carried out at a block 500.

In FIG. 8, there is an interrogation at a block 502 whether or not there has occured a change from the N (or P) range position to the D (or 2 or 1 or R) range position. If this is the case, there is another interrogation at a block 504 whether or not a flag $F_{TR}$ is set equal to 1. Since the flag $F_{TH}$ is equal to 0 initially, the routine proceeds to blocks 506 and 508. In the block 506, the timer T is reset equal to 0 (zero), while in the block 508, the flag $F_{TR}$ is set equal to 1. After the block 508, the routine proceeds to a block 510 where there is an interrogation whether or not the 2 range indicative signal is present. If this is not the case, the routine proceeds to a block 512 where there is an interrogation whether or not the snow mode is selected. If this is not the case, the routine proceeds to block 514 where there is an interrogation whether or not the timer T is greater than the first coupling period of time $T_2$ (see FIG. 10). Since this is not the case, the routine proceeds to a block 516 where there is an interrogation whether or not the timer T is greater than the first precharge period of time $T_1$ (see FIG. 10). Since this is not the case, the routine proceeds to a block 518 where the target line pressure $P_L$ is set equal to the first precharge level $P_{CH1}$. After this block 518, the routine proceeds back to the block 504. Since $F_{TR}$ is equal to 1, the routine proceeds to a block 520 where the timer T is fetched. After this block 520, the routine proceeds to the blocks 510, 512, 514, 516, 518, 504 and back to 510. This loop is maintained until the timer T reaches the first precharge period of time $T_1$. After the timer T has become greater than the first precharge period of time $T_1$, the routine proceeds from the block to a block 522. In the block 522, there is an interrogation whether or not a flag FF is set equal to 1. Initially this flag FF is reset equal to 0 (zero), the routine proceeds a block 524 where the target line pressure $P_L$ is decreased by $M_1$ and then to a block 526 where the flag FF is set equal to 1. After this step 526, the routine proceeds to a block 528 where the target line pressure $P_L$ is increased by the first rate $DP_{L1}$ before proceeding back to the block 504. The execution along a loop along the blocks 504, 520, 510, 512, 514, 516, 522 and 528 is repeated until the timer T reaches the first coupling period of time $T_2$. After the timer T has become greater than the first coupling period of time $T_2$, the routine proceeds from the block 514 where the flags $F_{TR}$ and FF are reset to 0 (zero), respectively. After this block 530, the routine proceeds to a block 532 where the target line pressure $P_L$ is set equal to the normal line pressure $P_L$ (TH).

If the result of the interrogation at the block 502 is negative (NO), the routine proceeds to the block 532.

Let us now assume that there has occurred a change from the N range position to the D range position in the snow mode.

In this case, the routine proceeds along the blocks 502, 504, 506, 508, 510, 512 down to a block 534. In the block 534, there is an interrogation whether or not the timer T is greater than the second coupling period of time $T_{22}$. Since this is not the case, the routine proceeds to a block 536 where there is another interrogation whether or not the timer is greater than the second precharge period of time $T_{12}$. Since this is not the case, the routine proceeds to a block 538 where the target line pressure $P_L$ is set equal to the second precharge level $P_{CH2}$ before proceeding back to the block 504. After the timer T has increased and becomes greater than the second precharge period of time $T_{12}$, the routine proceeds from the block 534 to a block 540 where there is an interrogation whether or not the flag FF is set equal to 1. Since this flag FF is initially equal to 0 (zero), the routine proceeds to blocks 542 and 544 where the target line pressure $P_L$ is decreased by $M_2$ and the flag FF is set equal to 1, respectively. After the block 544, the routine proceeds to a block 546 where the target line pressure $P_L$ is increased by the second rate $DP_{L2}$ before proceeding back to the block 506. Thereafter, the execution of a loop along the blocks 504, 520, 510, 512, 534, 536, 540 and 546 is repeated until the timer T reaches the second coupling period of time $T_{22}$. After the timer T has become greater than $T_{22}$, the routine proceeds from the block 534 to the block 530 and then to the block 532.

Assuming that there is a change from the N range position to the 2 range position, the routine proceeds along the blocks 502, 504, 506, 508 and 510 down to the block 534. Thus, the execution repeated subsequently is the same as the case when there has occurred a change from the N range position to the D range position in the snow mode.

Line pressure control along the target line pressure $P_L$ determined is not specifically shown in this routine for ease of simplicity of explanation. Such line pressure control may be effected in a different routine.

From the preceding description, it will now be appreciated that a desired speed or gear ratio is established in a smooth and quick manner after placing the manual valve from the non-drive range position to any one of the drive range positions.

What is claimed is:

1. In a method of operating an automatic transmission which comprises a plurality of hydraulically actuable and frictionally engageable couplings, a hydraulic control system including a pressure regulator valve capable of effecting pressure regulation to generate line pressure under the control of an actuator, and a control unit programmed to condition the hydraulic control system in one state wherein hydraulic fluid under the line pressure is supplied to one of the plurality of hydraulically actuable and frictionally engageable couplings to establish one gear ratio from a neutral or to condition the hydraulic control system in another state wherein hydraulic fluid under the line pressure is supplied to two of the plurality of hydraulically actuable and frictionally engageable couplings to establish another gear ratio from the neutral, the improvement being such that during a transition from the neutral to the one state, a control signal supplied to the actuator is subject to a pulse-like change with a first height corresponding to a first precharge level and a first duration of time corresponding to a first precharge period of time, then to a gradual increase at a first rate until a first coupling period of time is expired, and then to a drop to such a level as to keep the line pressure high enough to maintain torque transmission, while during a transition from the neutral state to the another state, the control signal is subject to a pulse-like change with a second height corresponding to a second precharge level and a second duration of time corresponding to a second precharge period of time, then to a gradual increase at a second rate until a second coupling period of time is expired, and then to a drop to such a level as to keep the line pressure high enough to maintain torque transmission.

2. In a method of operating an automatic transmission wherein one gear ratio is established owing to supply of hydraulic fluid under line pressure generated by a pressure regulator valve to one of hydraulically actuable and frictionally engageable couplings after placing a manual valve to a drive range position from a non-drive range position in a first mode, while in a second mode after placing the manual valve to the drive range position from the non-drive range position, another gear ratio is established owing to supply of hydraulic fluid under line pressure generated by the pressure regulator valve to at least two of the hydraulically actuable and frictionally engageable couplings, the improvement being such that after placing the manual valve to the drive range position from the non-drive range position in the first mode, a control signal, on which the pressure regulator valve effects pressure regulation in generating the line pressure, is subject to a pulse-like change with a first height corresponding to a first precharge level and a first duration of time corresponding to a first precharge period of time, then to a gradual increase at a first rate until a first coupling period of time is expired, and then to a drop to such a level as to keep the line pressure high enough to maintain torque transmission, while after placing the manual valve to drive range position from the non-drive range position in the second mode, the control signal is subject to a pulse-like change with a second height corresponding to a second precharge level and a second duration of time corresponding to a second precharge period of time, then to a gradual increase at a second rate until a second coupling period of time is expired, and then to a drop to such a level as to keep the line pressure high enough to maintain torque transmission.

3. In a system for operating an automatic transmission wherein one gear ratio is established owing to supply of hydraulic fluid under line pressure generated by a pressure regulator valve to one of hydraulically actuable and frictionally engageable couplings after placing a manual valve to a drive range position from a non-drive range position in a first mode, while in a second mode after placing the manual valve to the drive range position from the non-drive range position, another gear ratio is established owing to supply of hydraulic fluid under line pressure generated by the pressure regulator valve to at least two of the hydraulically actuable and frictionally engageable couplings, the improvement being such that after placing the manual valve to the drive range position from the non-drive range position in the first mode, a control signal, on which the pressure regulator valve effects pressure regulation in generating the line pressure, is subject to a pulse-like increase with a first height corresponding to a first precharge level and a first duration of time corresponding to a first precharge period of time, then to a gradual increase at a first rate until a first coupling period of time is expired, and then to a drop to such a level as to keep the line pressure high enough to maintain torque transmission, while after placing the manual valve to drive range position from the non-drive range position in the second mode, the control signal is subject to a pulse-like increase with a second height corresponding to a second precharge level and a second duration of time corresponding to a second precharge period of time, then to a gradual increase at a second rate until a second coupling period of time is expired, and then to a drop to such a level as to keep the line pressure high enough to maintain torque transmission.

4. In an automatic transmission wherein one gear ratio is established owing to supply of hydraulic fluid under line pressure generated by a pressure regulator valve to one of hydraulically actuable and frictionally engageable couplings after placing a manual selector valve to a drive range position from a non-drive range position in a first mode, while in a second mode after placing the manual selector valve to the drive range position from the non-drive range position, another gear ratio is established owing to supply of hydraulic fluid under line pressure generated by the pressure regulator valve to another of the hydraulically actuable and frictionally engageable couplings, an apparatus for attenuating a select shock occurring in the automatic transmission, the apparatus comprising:

means for conditioning the automatic transmission in the second mode;

means for detecting which one of a plurality of positions the manual selector is placed at; and means operatively connected to said conditioning means and said detecting means for urging the pressure regulator valve to vary the level of the line pressure such that after placing the manual selector valve to the drive range position from the non-drive range position in the first mode, the line pressure is subject to an increase toward a first height corresponding to a first precharge level, to a drop, then to a gradual increase at a first rate until a first coupling period of time is expired, and then to a drop to a level high enough to maintain torque transmission, while after placing the manual selector valve to the drive range position from the non-drive range position in the second mode, the line pressure is subject to an increase toward a second height corresponding to a second precharge level, to a drop, then to a gradual increase at a second rate until a second coupling period of time is expired, and then to a drop to a level high enough to maintain torque transmission.

5. An apparatus as claimed in claim 4, wherein said first height and said second height are different, said first rate and said second rate are different and said first coupling period of time and said second coupling period of time are different.

* * * * *